(12) United States Patent
Chang et al.

(10) Patent No.: US 9,551,238 B2
(45) Date of Patent: Jan. 24, 2017

(54) PIN CONNECTOR FOR CERAMIC MATRIX COMPOSITE TURBINE FRAME

(71) Applicant: United Technologies Corporation, Hartford, CT (US)

(72) Inventors: Hoyt Y. Chang, Manchester, CT (US); Shelton O. Duelm, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 935 days.

(21) Appl. No.: 13/723,499

(22) Filed: Dec. 21, 2012

(65) Prior Publication Data

US 2014/0093358 A1 Apr. 3, 2014

Related U.S. Application Data

(60) Provisional application No. 61/707,579, filed on Sep. 28, 2012.

(51) Int. Cl.
*F01D 25/28* (2006.01)
*F01D 25/24* (2006.01)

(52) U.S. Cl.
CPC ............ *F01D 25/28* (2013.01); *F01D 25/246* (2013.01); *F05D 2300/6033* (2013.01); *Y02T 50/672* (2013.01); *Y10T 403/217* (2015.01)

(58) Field of Classification Search
CPC ........ F01D 5/066; F01D 25/24; F01D 25/243; F01D 25/246; F01D 25/265; F01D 25/28; F05D 2300/6033
See application file for complete search history.

(56) References Cited

U.S. PATENT DOCUMENTS

| 4,111,603 | A | | 9/1978 | Stahl | |
|---|---|---|---|---|---|
| 4,123,199 | A | | 10/1978 | Shimizu et al. | |
| 4,639,194 | A | | 1/1987 | Bell, III et al. | |
| 5,129,783 | A | | 7/1992 | Hayton | |
| 5,224,825 | A | * | 7/1993 | Strang | F01D 25/246 415/135 |
| 5,291,732 | A | * | 3/1994 | Halila | F23R 3/60 60/752 |
| 5,353,586 | A | | 10/1994 | Taylor et al. | |
| 6,113,349 | A | | 9/2000 | Bagepalli et al. | |
| 6,382,905 | B1 | * | 5/2002 | Czachor | F01D 11/122 415/128 |
| 6,752,591 | B2 | * | 6/2004 | Hain | F01D 9/04 415/136 |
| 6,796,765 | B2 | | 9/2004 | Kosel et al. | |
| 6,895,761 | B2 | * | 5/2005 | Mitchell | F23R 3/60 60/752 |
| 6,935,836 | B2 | * | 8/2005 | Ress, Jr. | F01D 11/025 415/173.2 |
| 7,114,917 | B2 | | 10/2006 | Legg | |

(Continued)

*Primary Examiner* — Craig Kim
*Assistant Examiner* — Julian Getachew
(74) *Attorney, Agent, or Firm* — Carlson, Gaskey & Olds, P.C.

(57) ABSTRACT

A connector between a first object having a first coefficient of thermal expansion and a second object having a second coefficient of thermal expansion has a slot attaching to the second object. The slot formed by an inner shell having a slot shape and a first portion that blends into an outer surface of the second object, the slot having an enclosed portion facing forward and an aft portion that is open.

23 Claims, 2 Drawing Sheets

(56) References Cited

U.S. PATENT DOCUMENTS

| | | |
|---|---|---|
| 8,113,768 B2 | 2/2012 | Somanath et al. |
| 8,128,021 B2 | 3/2012 | Suciu et al. |
| 8,167,237 B2 | 5/2012 | Suciu et al. |
| 2004/0005216 A1* | 1/2004 | Suzumura ............... F01D 11/08 415/173.3 |
| 2011/0189009 A1* | 8/2011 | Shapiro ................ F01D 25/246 415/209.3 |

* cited by examiner

PIN CONNECTOR FOR CERAMIC MATRIX COMPOSITE TURBINE FRAME

CROSS REFERENCE TO RELATED APPLICATIONS

This application claims priority to U.S. Provisional Application No. 61/707,579, which was filed 28 Sep. 2012 and is incorporated herein by reference.

BACKGROUND

Turbofans are a type of gas turbine engine commonly used in aircraft, such as jets. The turbofan generally includes high and low pressure compressors, high and low pressure turbines, high and low speed spool shafts, a fan, and a combustor. The high-pressure compressor (HPC) is connected to the high-pressure turbine (HPT) by the high speed spool rotatable shaft, and together act as a high-pressure system. Likewise, the low-pressure compressor (LPC) is connected to the low-pressure turbine (LPT) by the low speed spool rotatable shaft, and together act as a low-pressure system. The low speed spool shaft is housed within the high speed spool shaft and is connected to the fan such that the HPC, HPT, LPC, LPT, and high and low spool shafts are coaxially aligned.

Air is drawn into the gas turbine engine by the fan and/or the LPC. The HPC further increases the pressure of the air drawn into the system. The high-pressure air then enters the combustor, which burns fuel and emits exhaust gas. The exhaust gas flows from the combustor into the HPT where it rotates the high spool shaft to drive the HPC. After the HPT, the exhaust gas is exhausted to the LPT. The LPT uses the exhaust gas to turn the low spool shaft, which powers the LPC and the fan to continually bring air into the system. Air brought in by the fan bypasses the LPC and HPC, and acts to increase the engine's thrust, driving the jet forward.

In order to support the high and low pressure systems, bearings are located within the gas turbine engine to help distribute the load created by the high and low pressure systems. The bearings are connected to an engine casing that houses a mid-turbine frame located between the HPT and the LPT by bearing support structures. The bearing support structures can be, for example, bearing cones or struts. The load from the bearing support structures are transferred to the engine casing through the mid-turbine frame.

SUMMARY

According to a non-limiting embodiment shown herein, a connector between a first object having a first coefficient of thermal expansion and a second object having a second coefficient of thermal expansion has a slot attaching to the second object, the slot formed by an inner shell having a slot shape and a first portion that blends into an outer surface of the second object, the slot having an enclosed portion facing forward and an aft portion that is open.

According to any previous claim provided herein, the first portion blends into the outer surface within the slot.

According to any previous claim provided herein, a pin extends from the first object, the pin is inserted in the slot wherein the pin minimizes axial and circumferential movement between the first object and the second object while permitting radial movement therebetween during changes in temperature.

According to any previous claim provided herein, an outer shell encloses the inner shell.

According to any previous claim provided herein, the outer shell has a second portion blending into the second object.

According to any previous claim provided herein, a second portion blends away from the slot, the second portion diverging from the first portion.

According to any previous claim provided herein, a filler is disposed between the inner shell and the outer shell.

According to any previous claim provided herein, the inner shell and the outer shell have a u-shape and a nadir of the u-shape is vertically oriented.

According to any previous claim provided herein, the first shell and the second shell are formed of a CMC material.

According to any previous claim provided herein, at least one of the first shell or the second shall have a warp that is oriented in parallel to an axis passing through the second object.

According to any previous claim provided herein, the first shell is formed of a CMC material.

According to any previous claim provided herein, the first shell has a warp that is oriented in parallel to an axis passing through the second object.

According to further non-limiting embodiment disclosed herein a connector between a turbine frame and an engine casing has a slot attaching to the turbine frame, the slot formed by an inner shell having a slot shape and a first portion that blends into an outer surface of the turbine frame, the slot having an enclosed portion facing forward and an aft portion that is open.

According to any previous claim provided herein, the first portion blends into the outer surface within the slot.

According to any previous claim provided herein, a pin extends from the engine casing, the pin is inserted in the slot.

According to any previous claim provided herein, an outer shell encloses the inner shell.

According to any previous claim provided herein, the outer shell has a second portion blending into the turbine frame.

According to any previous claim provided herein, the second portion blends away from the slot, the second portion diverging from the first portion.

According to any previous claim provided herein, a filler is disposed between the inner shell and the outer shell.

According to any previous claim provided herein, the inner shell and the outer shell have a u-shape and a nadir of the u-shape is vertically oriented.

According to any previous claim provided herein, the first shell and the second shell are formed of a CMC.

According to any previous claim provided herein, the first shell is formed of a CMC material.

According to any previous claim provided herein, the turbine frame is a mid-turbine frame.

According to any previous claim provided herein, a pin is trapped between a forward end of the slot and the turbine frame.

DESCRIPTION

Figure 1:
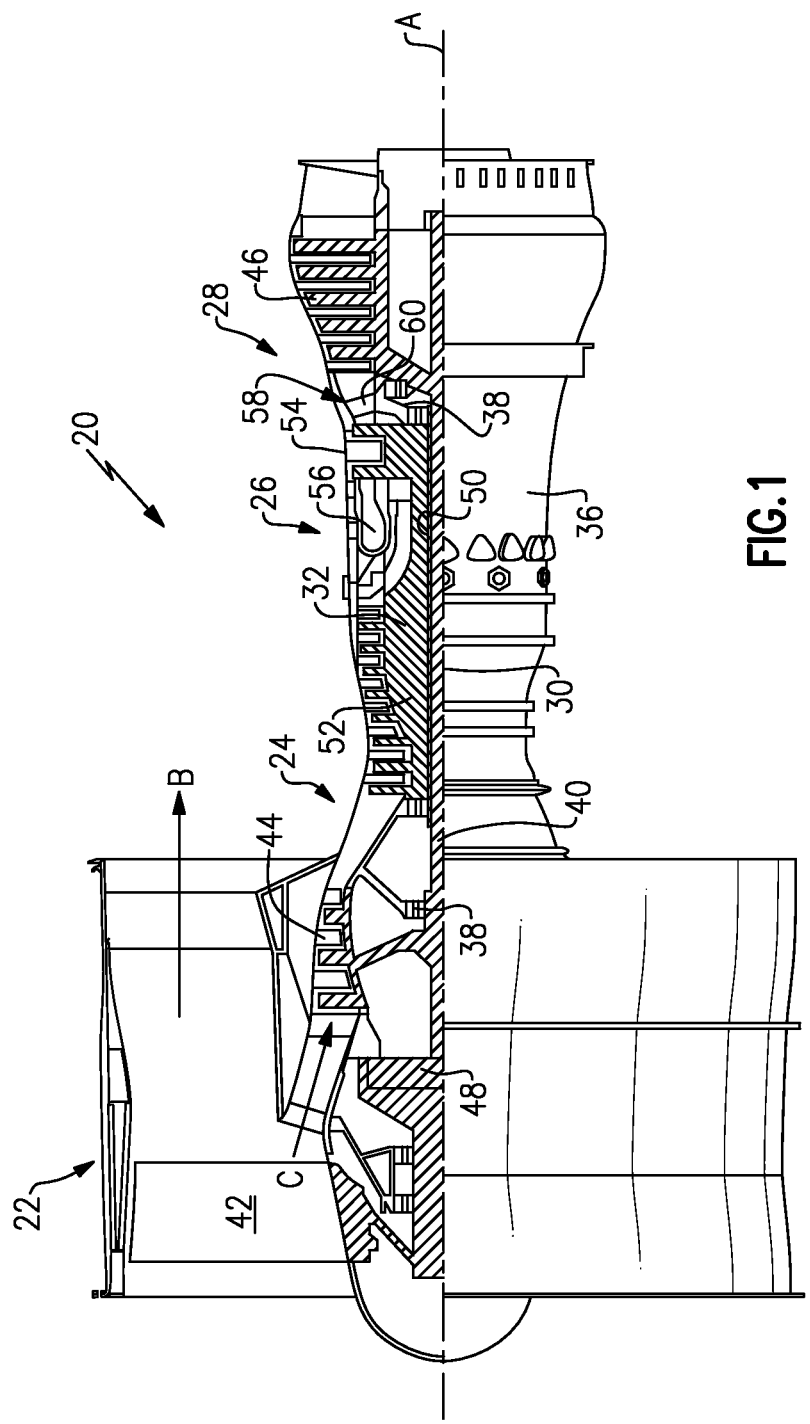
FIG. 1 is a schematic, partially cut-away view of a gas turbine engine incorporating a non-limiting embodiment described herein.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features.

Although depicted as a turbofan gas turbine engine in the disclosed non-limiting embodiment, it should be understood that the concepts described herein are not limited to use with turbofans as the teachings may be applied to other types of turbine engines including three-spool or geared turbofan architectures.

The fan section 22 drives air along a bypass flowpath B while the compressor section 24 drives air along a core flowpath C for compression and communication into the combustor section 26 then expansion through the turbine section 28.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and a high pressure turbine 54.

A combustor 56 is arranged between the high pressure compressor 52 and the high pressure turbine 54.

A mid-turbine frame 58 ("MTF") of the engine static structure 36 is arranged generally between the high pressure turbine 54 and the low pressure turbine 46. The MTF 58 further supports bearing systems 38 in the turbine section 28.

The inner shaft 40 and the outer shaft 50 are concentric and rotate via bearing systems 38 about the engine central longitudinal axis A, which is collinear with their longitudinal axes.

The core airflow C is compressed by the low pressure compressor 44, then the high pressure compressor 52, mixed and burned with fuel in the combustor 56, then expanded over the high pressure turbine 54 and low pressure turbine 46. The MTF 58 includes airfoils 60 which are in the core airflow path. The turbines 46, 54 rotationally drive the respective low speed spool 30 and high speed spool 32 in response to the expansion.

The gas turbine engine 20 is in one example a high-bypass geared aircraft engine. In a further example, the gas turbine engine 20 bypass ratio is greater than about six (6:1) with an example embodiment being greater than ten (10:1). The geared architecture 48 is an epicyclic gear train (such as a planetary gear system or other gear system) with a gear reduction ratio of greater than about 2.3 (2.3:1). The low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle.

In one disclosed embodiment, the gas turbine engine 20 bypass ratio is greater than about ten (10:1), and the fan diameter is significantly larger than that of the low pressure compressor 44. The low pressure turbine 46 has a pressure ratio that is greater than about five (5:1). The geared architecture 48 may be an epicycle gear train, such as a planetary gear system or other gear system, with a gear reduction ratio of greater than about 2.5 (2.5:1). It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet. The flight condition of 0.8 Mach and 35,000 feet, with the engine at its best fuel consumption, also known as bucket cruise Thrust Specific Fuel Consumption ("TSFC"). TSFC is the industry standard parameter of lbm of fuel being burned divided by lbf of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.45.

"Low corrected fan tip speed" is the actual fan tip speed in feet per second divided by an industry standard temperature correction of $[(Tram\ °\ R)/(518.7°\ R)]^{0.5}$. The "Low corrected fan tip speed" as disclosed herein according to one non-limiting embodiment is less than about 1150 feet per second (351 meters per second).

Figure 2:
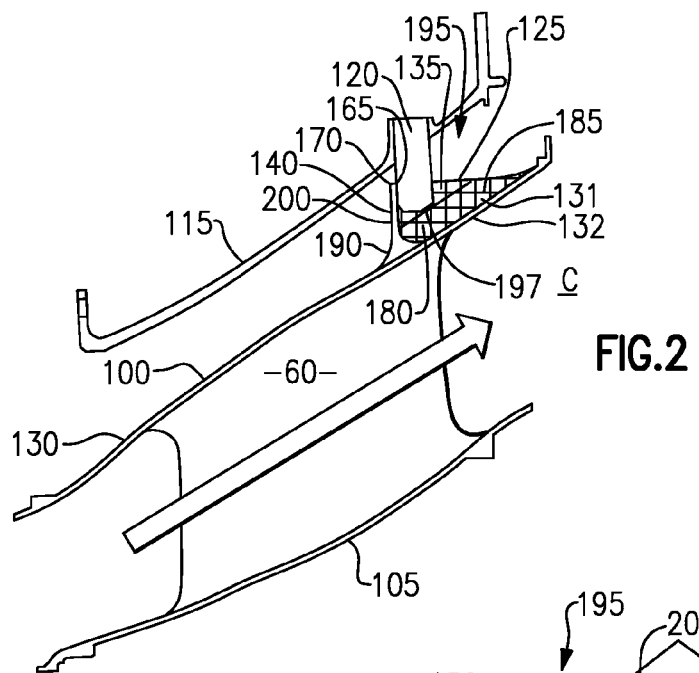
FIG. 2 is a schematic view of a mid-turbine frame and connector of the gas turbine engine of FIG. 1.

Referring now to FIG. 2, the MTF 58 includes a first duct 100, a second duct 105, and the airfoil 60 (used herein as a vane) connecting the first duct 100 to the second duct 105. The first and second ducts may be made of a ceramic material such as a ceramic matrix composite ("CMC") and the like, and the second duct 105 is radially inboard and passes through the first duct 100. CMC material is used in the MTF because of the intense heat of the gasses passing from the combustor 56 and the high pressure turbine 54 through the MTF 58.

The MTF 58 is supported and surrounded by an outer case 115, which may be metallic, a pin 120 extending from the outer case 115 and a connector 125 attaching to the first duct 100, as will be discussed infra. The connector 125 is also made of a ceramic material such as CMC and the like. The pin 120, which must withstand high axial and circumferential loads caused by the force of the gas turbine engine 20 is not a CMC and may be metallic, such as a nickel alloy. The pin 120 is conventionally attached to the outer case 115 such as by gluing, mechanical means, welding or brazing.

Figure 3:
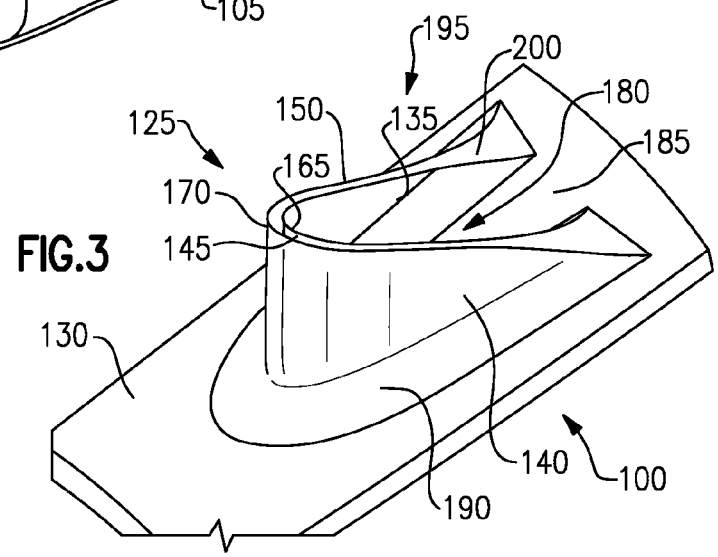
FIG. 3 is a perspective view of the connector of FIG. 2.
Figure 4:
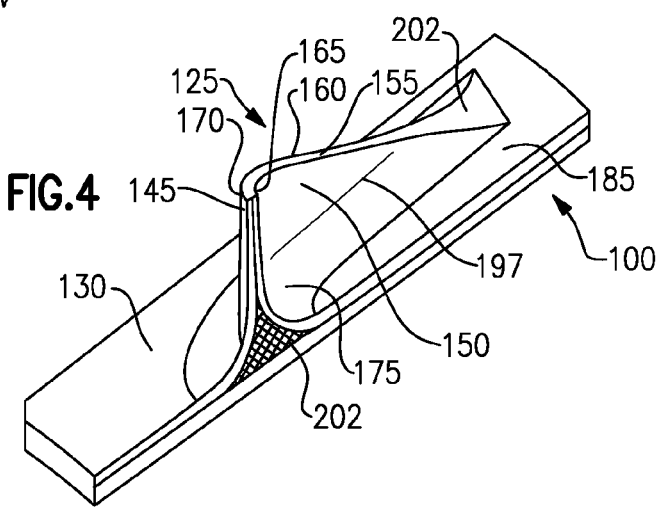
FIG. 4 is a cut-away view of the connector of FIG. 3.

Referring now to FIGS. 2-4, details of the connector 125 are shown. The connector 125 is made of the same material as the MTF in the non-limiting example shown, though other compatible, high-temperature resistant materials may be used. The material may be CMC fabric or unitape that is located upon an outer surface 130 the first duct 100. The fabric or unitape has strands forming warp 131 and weft 132 that are organized at 90° angles relative to each other. Alternate example CMC fabrics can be organized at alternate angles and achieve the same affect. CMC performs well in tension and the connector 125 is organized to engage the pin 120 such that the connector 125 is maximally placed in tension against the pin 120 such that the strands of the warp 131 are in tension.

The connector 125 has an inner shell 135 that has a u-shape and an outer shell 140 that also has a u-shape. The inner shell 135 and the outer shell 140 are in register with each other so that a radial outer surface 145 of the inner shell 135 is in close proximity to a radial outer surface 150 of the outer shell 140. The outer shell 140 encloses the inner shell circumferentially about the first duct 100.

The first duct 100 angles radially outwardly moving axially aft along the outer surface 130. As seen in FIG. 2, it appears that the top 155 of the inner shell 135 and the top 160 of the outer shell 140 extend horizontally until they reach the outer surface 130 of the first duct 100. At a nadir 165 of the u-shape of the inner shell 135 and a nadir 170 of the u-shape of the outer shell 140, the inner and outer shells 135, 140 are disposed vertically relative to the first duct 100. Near the bottom of the inner shell 135 and the outer shell 140, the inner shell 135 and the outer shell 140 flare outwardly to blend with the outer surface 130. An inner blending surface 175 flares from the inner shell 135 away from the outer shell 140 to meld into the inner surface within a slot 180 within the u-shaped inner shell 135. The slot has an open end 185 that opens axially aft. An outer blending surface 190 flares from the outer shell 140 away from the inner shell 135 to meld into the outer surface outside of the slot 180. The inner blending surface 175 tends to appear to close the u-shaped inner shell 135 as viewed from a top 195 (see FIGS. 2 and 3) and the outer blending surface 190 tends to make the outer shell appear to have a bell-shaped surface viewed from the top 195. The blending surfaces 190 start at a point 197 below a midpoint 200 of the inner and outer shells 135, 140 between the nadirs 165, 170 thereof and the first duct 100. The points 197 form a line that is in parallel to the outer surface 130 of the first duct 100. The concept provided for herein will work whether the first duct 100 is angled or not provided the pin 120 is oriented radially from the first duct 100.

The pin 120 is parallel and in contact with the inner shell 135 and the outer shell 140 at the nadirs 165, 170 thereof. The pin 120 has no sharp edges that might tend to shear the connector 125. The pin 120 and the connector 125 move radially relatively to each other to allow for different coefficients of expansion due to heat, but the pin 120 minimizes axial and circumferential movement of the connector 125 and the MTF 58 due to the connection and the CMC material of the connector 125. The pin 120 is trapped in the slot 180 by the nadir 165 and the inner shell 135 (see FIG. 2).

The area 202 between the shells may be filled with non-compressible filler, such as resin, fiber, cloth, tape, or the like, as the inner and outer shells bear the axial and circumferential load of the gas turbine engine 20. The inner and outer blending surfaces 175 and 190 create a large footprint on the outer surface 130 as the inner and outer blending surfaces separate from each other as they approach the outer surface 130. The large footprint minimizes bending of the inner and outer shells 135, 140 as axial loads of the gas turbine engine are transferred therefrom to the first duct 100 thereby minimizing a probability that the connector 125 will fail by crushing, bending, shearing or the like.

The connector warps 131 are in tension axially, a favorable direction in which the CMC is strong, as opposed to putting the warp 131 in bending or shear. The pin 120 is trapped in the slot 180 of the connector 125, which is in tension along the warp 131, and there is little shearing and fewer stress concentrations.

The connector 125 may be pre-formed and then glued to the outer surface 130 or may be formed in one-piece with the first duct 100. The MTF 58 is annular and there as many connectors 125 and pins 120 as necessary to manage the axial load of the gas turbine engine 20.

Although an example embodiment has been disclosed, a worker of ordinary skill in this art would recognize that certain modifications would come within the scope of this disclosure. For that reason, the following claims should be studied to determine the scope and content of this disclosure.

We claim:

1. A connector for a gas turbine engine between a first annular object having a first coefficient of thermal expansion and a second annular object having a second coefficient of thermal expansion, said connector comprising,
   a slot attaching to said second object, said slot formed by an inner shell having a slot shape and a first portion that blends into an outer surface of said second object, said slot having an enclosed portion facing a forward axial end of the first annular object and an open portion facing an aft axial end of the first annular object, the slot further including a radially outward facing open portion,
   an outer shell partially enclosing the inner shell, and defining a gap between a base of said outer shell and said inner shell.

2. The connector of claim 1 further comprising:
   wherein said first portion blends into said outer surface within said slot.

3. The connector of claim 1 further comprising:
   a pin extending from said first object, said pin is inserted in said slot wherein said pin minimizes axial and circumferential movement between said first object and said second object while permitting radial movement therebetween during changes in temperature.

4. The connector of claim 1 wherein said outer shell has a second portion blending into said second object.

5. The connector of claim 4 wherein said second portion blends away from said slot, said second portion diverging from said first portion.

6. The connector of claim 1 further comprising:
   a filler disposed in said gap between said inner shell and said outer shell.

7. The connector of claim 1 wherein said inner shell and said outer shell have a u-shape and a nadir of the u-shape is vertically oriented.

8. The connector of claim 1 wherein said inner shell and said outer shell are formed of a CMC material.

9. The connector of claim 1 wherein at least one of said inner shell or said outer shell have a warp that is oriented in parallel to an axis passing through said second object.

10. The connector of claim 1 wherein said inner shell is formed of a CMC material.

11. The connector of claim 1 wherein said inner shell has a warp that is oriented in parallel to an axis passing through said second object.

12. A connector between a turbine frame and an engine casing, said connector comprising,
   a slot attaching to said turbine frame, said slot formed by an inner shell having a slot shape and a first portion that blends into an outer surface of said turbine frame, said slot having an enclosed portion facing a forward axial end of the engine casing and an open portion facing an aft axial end of the engine casing, the slot further including a radially outward facing open portion; and
   an outer shell partially enclosing the inner shell, and defining a gap between a base of said outer shell and said inner shell.

13. The connector of claim 12 further comprising:
   wherein said first portion blends into said outer surface within said slot.

14. The connector of claim 12 further comprising:
a pin extending from said engine casing, said pin is inserted in said slot, wherein said pin minimizes axial and circumferential movement between said engine casing and said turbine engine frame while permitting radial movement therebetween during changes in temperature.

15. The connector of claim 12 wherein said outer shell has a second portion blending into said turbine frame.

16. The connector of claim 15 wherein said second portion blends away from said slot, said second portion diverging from said first portion.

17. The connector of claim 15 further comprising:
a filler disposed in said gap between said inner shell and said outer shell.

18. The connector of claim 15 wherein said inner shell and said outer shell have a u-shape and a nadir of the u-shape is vertically oriented.

19. The connector of claim 15 wherein said inner shell and said outer shell are formed of a CMC.

20. The connector of claim 12 wherein said inner shell is formed of a CMC material.

21. The connector of claim 12 wherein said turbine frame is a mid-turbine frame.

22. The connector of claim 12 wherein a pin is trapped between a forward end of said slot and said turbine frame.

23. The connector of claim 1, wherein the radially outward facing open portion tapers into the open portion facing the aft axial end.

* * * * *